3,264,206
CROSS-LINKED ASPHALTENES
Seymour W. Ferris, Mount Holly, N.J., and Ernest P. Black, West Chester, and James B. Clelland, Newtown Square, Pa., assignors to Sun Oil Company, Philadelphia, Pa., a corporation of New Jersey
No Drawing. Filed Dec. 22, 1961, Ser. No. 161,375
7 Claims. (Cl. 208—44)

This invention relates to a new composition and to a process of making it. More particularly, it relates to asphaltenes which have been treated chemically to increase molecular weight and to produce products which are radically different from the original asphaltenes.

Asphalts are colloidal systems having a disperse phase and a continuous phase. The disperse phase, i.e., the micelles, comprises the components of highest molecular weight—known to the art as asphaltenes. They are solids. The continuous, or intermicellar phase, represents the components of lower molecular weight; and these are known as maltenes. They are non-solids. The maltenes are further divided for purposes of classification into a resin fraction and an oil fraction.

Asphaltenes are organic materials and are defined by their solubility characteristics in certain arbitrarily selected solvents. The asphaltenes are insoluble in low-boiling saturated hydrocarbons such as petroleum naphtha, pentane, and hexane, but are soluble in carbon tetrachloride and carbon disulfide. These solubility characteristics are the basis of the separation of asphaltenes as a distinct phase. They are usually separated from the solvent in the form of a coarse brown-black powder having essentially no cohesiveness. The yield and properties of an asphaltene depend upon the asphalt source, the kind and amount of solvent used for separation, and the separation conditions. Asphaltenes have a high carbon-to-hydrogen atomic ratio and contain varying amounts of oxygen, sulfur, and nitrogen. A high carbon-to-hydrogen ratio indicates a strongly aromatic nature. For example, the value for saturated hydrocarbons is about 0.5; for benzene, about 1.0; and for naphthalene, about 1.25. The C:H ratio of asphaltenes derived from some typical sources is as follows:

| Origin: | C:H ratio of asphaltenes (naphtha precipitation) |
|---|---|
| Residual bitumens | .85–.91 |
| Blown bitumens | .82–.88 |
| Highly cracked material | 1.25 |
| Trinidad asphalt | .79 |
| Gilsonite | .71 |

Asphaltenes are believed to have a molecular weight of from about 2,000 to about 10,000. The actual molecular configuration of asphaltenes is not known. Some observers suggest a fused ring configuration, and other suggest rings joined by chains ("The Properties of Asphaltic Bitumen," Pfeiffer).

Asphalts flow under very small stresses and thus have no application in fields of use which require lasting rigidity under stress and temperature fluctuation. For example, in road-building the asphalt merely holds the aggregate together; the aggregate supplies the rigidity. The surface asphalt softens markedly in warm weather.

Asphaltenes are a powder and may be pressed or molded into various shapes, but the shapes are very brittle and break apart rapidly under pressure.

The object of this invention is to convert asphaltenes to a solid cross-linked form having high compressive strength. A further object of the invention is to provide a modified, asphaltene-base, molded product having rigidity and strength at high temperatures. Another object of the invention is to provide a process for chemically cross-linking asphaltenes.

We have found that asphaltenes are very reactive with chlorine and that when part of the chlorine is removed, the product exhibits properties indicating that the asphaltene molecules have been joined. The melting point of the treated asphaltenes is raised at least 300° F., and the solubility in $CCl_4$ and $CS_2$ is greatly lowered. Additionally we have found that asphaltenes will take up from 10–30% wt. percent chlorine at ambient temperature without using a solvent.

The cross-linked asphaltenes of the present invention can be molded into suitable shapes for use as construction materials, roofing materials, paving and membrane lining materials, pipe and pipe coating, and potting compounds. Our treated asphaltenes are waterproof, rot proof, vermin proof, and fire resistant. They may be combined with fillers and plasticizers to produce hard board, insulating board, and wallboard. They may be used in conjunction with wood, metal, and plastics to form panels.

The source of the asphaltenes treated is not critical. Any bitumen or asphalt containing asphaltenes is suitable. The two principal sources are native asphalts and asphalts resulting from petroleum refining operations. Asphalt from petroleum refining operations like deasphalting of crude oils will usually require further solvent treatment to separate or further concentrate the asphaltenes. Air blown and other chemically treated asphalts can be used. It is not necessary that the asphaltene concentration of the starting material be 100 percent. However, a concentration of at least 50 wt. percent asphaltenes is required to obtain products with the desired properties. The preferred concentration of asphaltenes is 75 to 100 percent by weight. Solvents such as petroleum naphtha, pentane, hexane, cyclohexane, and diethylether can be used to concentrate the asphaltenes. The asphaltene starting material will have a carbon-to-hydrogen atomic ratio of from about 0.70 to about 1.00 and will contain 0–5 wt. percent each of sulfur, nitrogen, and oxygen. Metals such as vanadium, nickel, and iron may be present in small amounts usually 1 to 2000 parts per million. For treatment the asphaltenes can be ground to a fine powder and contacted in the dry state, or they may be dispersed in a solvent such as $CCl_4$.

The softening point of the original asphaltene material can be about 300–400° F., and it is 95–99 percent soluble in $CS_2$. These properties depend on the conditions of the method of concentration.

In carrying out the invention the chlorination and dechlorination steps of the process may be accomplished using conventional equipment. The asphaltene starting material may be obtained by means known in the art, usually multistep solvent precipitation. The asphaltene is placed in any suitable closed reactor and contacted with a chlorinating agent such as chlorine gas. Dechlorination can be accomplished by heating, preferably in an inert atmosphere, or by chemical means. Suitable temperatures, times and the degree of chlorination and dechlorination may be ascertained by those skilled in the art.

The chlorination is conducted at temperatures ranging from 10 to 150° F. Pressures ranging from sub-atmospheric to 100 p.s.i. or more can be used. The time of treatment is on the order of between 5 minutes to 48 hours. Ordinarily times of 15 to 90 minutes at treating temperatures ranging from 50 to 100° F. are preferred. The asphaltenes may be agitated during chlorination by feeding the chlorine through a sparger, rotating the reactor, motor-driven stirrer, or by other applicable means. The chlorine is usually supplied as chlorine gas although chlorine in other forms can be used. From 5 to 40 weight percent chlorine can be added based on the asphaltene starting material.

The dechlorination step may be carried out immediately following the chlorination step. It can be accomplished by heating in an inert atmosphere such as nitrogen or in air. When the chlorination has been done in the presence of a solvent, dechlorination can be carried out with sodium or potassium. When dechlorination is accomplished by heating, temperatures higher than the chlorination temperature, preferably ranging from 250 to 700° F., are suitable. The chlorine content of the final product is preferably from 5 to 15 weight percent, but higher or lower chlorine contents can be used.

The following examples show various non-limiting embodiments of the invention:

EXAMPLE I

Asphaltenes were prepared from a vacuum reduced petroleum residuum asphalt having the following properties:

| | |
|---|---|
| Viscosity-Saybolt Furol @ 210° F | 1191 |
| Specific gravity @ 77° F. | 1.019 |
| Softening point, ° F. | 111 |
| Penetration: | |
| @ 32° F. (ASTM–D–5–25) | 25 |
| @ 39.2° F | 33 |
| @ 77° F. | 103 |
| Flash (open cup), ° F. | 655 |
| Solubility in 86° naphtha (AASHO T-4635)[1] | 78.3 |
| Naphtha asphaltenes, percent | 21.7 |

[1] For the purpose of these examples, solubility in naphtha will be considered the measure of asphaltenes, i.e., the portion which is insoluble in the solvent is asphaltenes.

6.85 gal. (35 lb.) of the above asphalt was heated to about 180° F. and extracted with 30.3 gal. of 86° naphtha. The solution was allowed to settle, and the solvent layer was drawn off. The raffinate was extracted again with 34.3 gal of solvent. After settling, the solvent layer was drawn off. The wet product was air-dried, then heated in a steam bath, and dried. The dry asphaltene yield was 6066 grams.

Two additional portions of the above asphalt were extracted in the same manner. The total dry asphaltenes amounting to 15,189 grams were ground and sieved to a fine powder. Ninety-six percent of the powder passed through an 8-mesh sieve. The asphaltenes were 13.1 percent soluble in naphtha, 99.8 percent soluble in carbon disulfide, and 98.7 percent soluble in carbon tetrachloride. Thus the naphtha asphaltenes were 86.9%. This material was used for the examples which follow.

EXAMPLE II 504 grams of the asphaltenes of Example I were placed in an 11-inch-diameter glass dish having a glass cover. The cover had openings for circulating chlorine. Chlorine was passed from a cylinder through tubing and the dish at a rate of 250–600 cc./min. for 20.5 hours at 80° F. Nitrogen was then passed through the dish to remove unreacted chlorine. The net weight gain of the chlorinated asphaltenes was 178 grams.

Runs 1–7 of Table A show the effect of time on the quantity of chlorine reacted. Runs 8 and 9 show the effect of dissolving the asphaltenes in carbon tetrachloride and bubbling chlorine through the solution.

Conventional whole asphalts cannot be chlorinated at temperatures below about 150° F. without the use of a solvent.

Chlorination has no appreciable effect on the melting point and naphtha solubility of asphalts or of asphaltenes. Dechlorination, however, results in dramatic changes in the properties and molecular configuration of the asphaltenes.

*Table A*

CHLORINATED ASPHALTENES

| Run No. | Asphaltenes, Gms. | CCl₄ (cc.) | Treating Conditions | | Cl, weight percent | C/H | CS₂ [a] sol., percent | CCl₄ [b] sol., percent | Naphtha [c] sol., percent |
|---|---|---|---|---|---|---|---|---|---|
| | | | Temp. (° F.) | Time (hrs.) | | | | | |
| | Untreated Asphaltenes | | | | | 0.85 | 99.8 | 98.7 | 13.1 |
| 1 | 504 | | 80 | 20.5 | 27.1 | 0.91 | 99.7 | 99.0 | 19.0 |
| 2 | 500 | | 80 | 5.5 | 16.1 | 0.90 | | | |
| 3 | 500 | | 80 | 4.17 | 17.75 | 0.94 | 99.3 | 98.7 | 21.9 |
| 4 | 500 | | 80 | 0.38 | 4.72 | 0.84 | | | |
| 5 | 500 | | 80 | 41.0 | 30.0 | | | | |
| 6 | 1,000 | | 80 | 1.0 | 2.96 | | | | |
| 7 | 60 | 350 | 80–115 | 2.0 | 34.1 | 1.08 | | | |
| 8 | 100 | 600 | 80–130 | 0.22 | 12.9 | 0.96 | | | |
| 9 | 50 | 320 | 80 | 2.0 | 41.0 | 1.07 | | | |

[a] Solubility obtained following ASTM D4-52.
[b] Solubility obtained following ASTM D165-42.
[c] Solubility obtained following AASHO T-4635.

EXAMPLE III 500 grams of the chlorinated asphalt of Example II, containing 27.1 weight percent chlorine, was placed in an 11-inch-diameter covered glass dish. The dish was placed in a constant-temperature oven, and nitrogen was passed through the dish. The oven was maintained at 400° F. for 3½ hours. At the end of this time the weight loss was 71 grams, and the chlorine content was 13.25 percent. The properties of this product are shown in Run 1 of Table B.

200 grams of the above product were further dechlorinated in the same dish and oven at 500° F. for a further period of 3½ hours. The properties of this product are shown in Run 2 of Table B.

Runs 3–5 show the results of dechlorination on asphaltenes chlorinated to 16.1, 4.72, and 2.96 weight percent.

Runs 6–8 show the results of dechlorination in the presence of air and oxygen.

Runs 9 and 10 show the results of dechlorination in the presence of a sodium dispersion.

Run 11 shows the results of treating asphaltenes derived from Gilsonite—a native bitumen. 50 grams of Gilsonite asphaltenes were chlorinated at 80° F. in powder form for 30 minutes to a chlorine content of 21.8%. The intermediate product was dechlorinated at an oven temperature of 550° F. for 1.0 hour to a chlorine content of 4.37%.

Table B
DECHLORINATED ASPHALTENES

| Run No. | Dechlorination Temp., °F. | Dechlorination Time, Hours | Chlorine Before | Weight Percent After | C/H, Ratio | CS₂ Sol., Percent | CCl₄ Sol., Percent | Naphtha Sol., percent | M.P., °F.[a] | M.R.[b] | °F. Pen. 5[c] | Mold Rating[d] |
|---|---|---|---|---|---|---|---|---|---|---|---|---|
| | Untreated | Asphaltenes | | | 0.85 | 99.8 | 98.7 | 13.1 | 333 | 186 | 170 | 8 |
| 1 | 400 | 3.5 | 27.1 | 13.25 | 0.97 | 24.1 | 13.9 | 4.0 | 900 | | | 5 |
| 2 | 400/500 | 3.5/3.5 | 27.1 | 9.52 | 1.01 | 29.2 | 17.8 | 0.7 | 900 | 305 | 495 | 4 |
| 3 | 550 | 1.0 | 16.1 | 1.95 | 1.07 | 49.5 | 60 | 6.1 | 1,000 | 192 | 440 | 6 |
| 4 | 550 | 1.0 | 4.72 | 1.36 | 0.90 | 74.3 | 59.1 | 15.5 | 750 | 224 | | 8 |
| 5 | 550 | 1.0 | 2.96 | 1.32 | | 84.0 | 75.0 | 23.7 | 600 | 357 | | 8 |
| 6[e] | 300 | 4.0 | 34.1 | 25.9 | 1.10 | | | | | | | |
| 7[e] | 400 | 2.0 | 34.1 | 5.9 | 2.21 | | | | | | | |
| 8[f] | 400 | 5.5 | 12.9 | 1.22 | 1.94 | | | | 800 | | | |
| 9[g] | Sodium | | 12.9 | 0.30 | 0.93 | | | | | | | |
| 10[g] | Sodium | | 16.2 | 9.7 | 0.98 | | | | | | | |
| 11 | 550 | 1.0 | 21.8 | 4.37 | | 8.42 | | 4.11 | 900 | | | |

[a] Melting points over 300° F. were obtained by hot plate using "Tempilstiks" (Tempil Corp., 132 W. 22d St., N.Y.C.) in an atmosphere of nitrogen.
[b] Modulus of rupture, p.s.i.g. at 75° F.
[c] Temp. in degrees Fahrenheit to which sample must be heated to obtain a penetration of 5.
[d] An arbitrary measurement in which 10 represents excellent compaction and 0 represents essentially no compaction.
[e] Dechlorinated in the presence of air.
[f] Dechlorinated in the presence of air and oxygen.
[g] Dechlorinated with sodium in xylene at 180–200° F. for 1 hour.

Table B shows that dechlorination results in a dramatic reduction in the solubility of asphaltenes in carbon disulfide, i.e., from 99.8 to values in the range of from 24.1 to 49.5. Since asphaltenes and chlorinated asphaltenes are almost completely soluble in the solvent, it is apparent that the molecular configuration of the asphaltenes has been radically altered by the dechlorination treatment. The same effect is observed when solubility is tested with carbon tetrachloride. These results indicate that the asphaltenes are polymerized and cross-linked by the chlorination-dechlorination process described above. Additional evidence of higher molecular weight is found by noting the increase in melting point, e.g., from 333° F. to 600 to over 1,000° F. and by noting the increase in modulus of rupture and the temperature required to obtain a penetration of 5. These properties clearly differ from the properties of air blown (oxidized) asphalt which has a naphtha solubility of from 50–90% and a solubility in carbon disulfide of 95–100 (see Abraham, Asphalts and Allied Substances vol. 2, 1961, page 175).

EXAMPLE IV

In order to compare the effect of heat alone on asphaltenes with the chemical treatment of the invention, the following runs were made: 50 grams of the asphaltenes described in Example I were heated at 550° F. in a constant temperature oven under a nitrogen atmosphere for one hour. A second sample was heated under the same conditions with air.

The properties of the treated and untreated samples were as follows:

Table C

| Example # | 1 | 2 | 3 |
|---|---|---|---|
| Treatment | None | (¹) | (²) |
| Melting Pt. °F | 333 | 370 | 380 |
| Sol. in CS₂, Percent | 99.8 | 99.0 | 98.1 |
| Sol. in CCl₄, Percent | 98.7 | 99.1 | 98.4 |
| Sol. in Naphtha, Percent | 13.1 | 31.2 | 30.3 |

¹ Nitrogen.
² Air.

These data show that heating alone has little effect on the properties of asphaltenes in that melting points and solubility in CS₂ and CCl₄ were virtually unaffected.

EXAMPLE V

For purposes of comparison, three conventional asphalts were chlorinated and dechlorinated as follows:

(1) 100 grams of residual asphalt, having a softening point of 111° F., was chlorinated for 30 minutes in 500 cc. of CCl₄. Temperature rose from 70 to 113° F. during the run. Product dried and ground to a powder.

(2) 23.1 grams of blown asphalt, having a softening of 215° F. was chlorinated as a powder for 30 minutes at 80° F.

Runs 1 and 2 were dechlorinated by heating under N₂ for 1.0 hour at 550° F. oven temperature.

(3) 646 grams of residual asphalt, having a softening point of 111° F., was blown with chlorine at a temperature ranging from 450 to 640° F. for 4 hours. At this temperature the sample was being chlorinated and dechlorinated.

The properties of the products were as follows:

Table D

| Example # | 1 | 2 | 3 |
|---|---|---|---|
| Chlorine content, wt. percent (before dechlorination) | 7.1 | 8.27 | |
| Chlorine content, wt. percent (after dechlorination) | 3.56 | 2.25 | 3.5 |
| Softening point (R&B), °F | | | 218 |
| Hot plate melt pt., °F | 660 | 690 | 200 |
| Sol. in CS₂, percent | 64.2 | 65.46 | 99.13 |
| Sol. in CCl₄, percent | | | |
| Sol. in Naphtha, percent | 53.1 | 48.8 | 73.87 |

These data show that while the melting point of asphalt is improved by the treatment the solubilities remain high, indicating that the products are not cross-linked. When these treated asphalts were molded at 285° F. and 2000 p.s.i., the samples were almost completely squeezed from the mold in less than 1 minute.

The cross-linked asphaltenes in the present invention can be mixed or blended with various fillers and molded into shaped articles. Suitable fillers include asbestos, sand, clays, paper, wood, flour, sawdust, glass fibers, asphalts, calcium carbonate, inorganic oxides and silicates, metallic fibers, powders, etc.

EXAMPLE VI 25 parts of the chlorinated and dechlorinated asphaltenes of Run 5, Table B, were mixed using a mortar and pestle with 75 parts of bar sand. A portion of the mixture was formed into a 1 x 4 x ⅛ inch test blank by heating at a temperature of about 275° F. in a Carver press at a pressure of about 5000 p.s.i.g. The modulus of rupture was obtained by placing the test blank over two bars spaced two inches apart and exerting pressure on the middle cross section until the blank broke. The formula $$MR = \frac{3PL}{2BT^2}$$ in which:

P = Load in pounds
L = Blank length—inches
B = Blank breadth—inches
T = Blank thickness—inches was used to obtain the numerical value for modulus of rupture. Runs were made at room temperature. Table C shows the effect of the blending of asphaltenes treated according to the invention with various fillers. The treated asphaltenes of Run 5, Table B, were used as the asphaltene component in each run.

*Table E*
TREATED ASPHALTENES AND FILLERS

| Run No. | Filler | | Mixing Method | Molded Article | |
|---|---|---|---|---|---|
| | Type | Weight Percent | | Appearance Rating | Modulus of Rupture |
| 1 | | Blank | | 7 | 357 |
| 2 | Sand | 75 | Mortar and Pestle | 7 | 200 |
| 3 | do | 2 | do | 7 | 280 |
| 4 | Glass wool | 2 | do | 8 | 304 |
| 5 | Ground paper | 5 | do | 8 | 370 |
| 6 | do | 25 | Food Chopper | | 960 |
| 7 | do | 50 | do | 9 | 1,645 |
| 8 | do | 50 | Waring Blendor | 6 | 2,100 |
| 9 | do | 75 | do | 7 | 2,420 |
| 10 | do | 100 | do | 6 | 1,320 |
| 11 | Asbestos | 25 | do | 8 | 500 |

The table shows that ground paper is an excellent filler, particularly in amounts ranging from 25 to 100 wt. percent based on the treated asphaltenes. A unique feature of the paper filled molds was the very high moisture resistance. After 60 hours immersion in water at ambient temperature the test specimen absorbed no measurable amount of moisture.

The properties of the cross-linked asphaltenes of the invention can be varied by varying the feed and the treating conditions as follows:

| | Feed and Conditions | Suitable | Preferred |
|---|---|---|---|
| 1 | Asphaltene content of feed | 50–100 weight percent | 75–100 weight percent. |
| 2 | Chlorination | Any suitable temp. | 50–150° F. |
| | | Any suitable press. | 5–100 p.s.i.a. |
| 3 | Dechlorination | Any suitable temp. higher than the chlorination temp., i.e. 100–900° F. | 250–700° F. |
| | | Any suitable press., i.e. 5–100 p.s.i.a. | 15–17 p.s.i.a. |
| | Products | | |
| 4 | Melting Point | 600–1,500° F | 750–1,200° F. |
| 5 | Solubility in $CS_2$ | 0–70 weight percent | 0–50 weight percent. |
| 6 | Solubility in $CCl_4$ | 0–70 weight percent | 0–50 weight percent. |
| 7 | Solubility in Naphtha | 0–25 weight percent | 0–15 weight percent. |

Cross-linked asphaltene products having a $CS_2$ solubility of 0–50 wt. percent together with a naphtha solubility of 0–15 wt. percent and a melting point of 750–1200° F. give excellent strength and high temperature properties to coating compositions and molded articles in which they are employed in major or minor amounts, i.e., from 25–100 wt. percent.

It is to be understood that the foregoing detailed description is given merely by way of illustration and many alterations may be made therein without departing from the spirit of the invention. This applies particularly to the use of fillers, solvents, plasticizers, ordinary asphalt, tars, and other materials in conjunction with the cross-linked asphaltenes of the invention to formulate liquid or solid products. It further applies to the method, conditions and degree of chlorination, to the method, conditions and degree of dechlorination and to the melting point and solubility of the cross-linked asphaltene products.

We claim:
1. A composition consisting essentially of cross-linked asphaltene molecules characterized by a melting point of at least 600° F., and a solubility in carbon disulfide of not more than 50 wt. percent.
2. An asphalt derived composition consisting essentially of at least 50 wt. percent cross-linked asphaltene molecules characterized by a melting point in the range of 600–1500° F. and a solubility in carbon disulfide in the range of 1 to 80 percent.
3. A composition consisting essentially of from 50–99 wt. percent cross-linked asphaltene molecules characterized by a melting point in the range of 750 to 1200° F. and a solubility in carbon disulfide of 1 to 50 percent.
4. An asphalt derived composition consisting essentially of from 50 to 99 wt. percent cross-linked asphaltene molecules and from 1 to 50 wt. percent maltenes characterized by a melting point in the range of 600–1500° F., a solubility in carbon disulfide in the range of 1 to 50 wt. percent and a solubility in petroleum naphtha in the range of 1 to 25 wt. percent.
5. An asphalt derived moldable composition consisting essentially of from 50 to 99 wt. percent cross-linked asphaltene molecules containing bound chlorine and from 1 to 50 wt. percent maltenes containing bound chlorine said composition being characterized by a melting point in the range of 750–1200° F., a solubility in carbon disulfide in the range of 1 to 25 wt. percent and a solubility in petroleum naphtha in the range of 1 to 10 wt. percent said composition containing from 0.5 to 10 wt. percent bound chlorine.

6. A process for the preparation of cross-linked asphaltenes which comprises chlorinating a bituminous feed material containing 50–100 percent asphaltenes at a temperature in the range of 50–100° F. until the asphaltenes contain 5–30 wt. percent chlorine and dechlorinating the intermediate product in an inert atmosphere at a temperature in the range of 200–700° F. until the product contains from 1–10 wt. percent chlorine.

7. A process for the preparation of cross-linked asphaltenes which comprises the steps of dispersing an asphaltene concentrate derived from asphalt in a suitable solvent, contacting the dispersion with chlorine gas until the chlorine content of the intermediate is in the range of from 5–30 wt. percent, removing the solvent dechlorinating the intermediate with a sodium dispersion in xylene and recovering a product containing from 1–10 wt. percent chlorine from the solvent.

References Cited by the Examiner

UNITED STATES PATENTS

| | | | |
|---|---|---|---|
| 1,398,084 | 11/1921 | Wickenden | 106—278 |
| 1,979,677 | 11/1934 | Douthett | 208—22 |
| 2,247,375 | 7/1941 | Hersberger | 208—44 |
| 2,276,155 | 3/1942 | Carr | 208—33 |
| 2,348,832 | 5/1944 | Mauch et al. | 208—22 |
| 2,352,197 | 11/1950 | Rowe | 106—281 |
| 2,545,963 | 3/1951 | Mark | 208—44 |
| 2,560,650 | 7/1951 | Kronstein | 208—44 |
| 2,634,208 | 4/1953 | Miscall et al. | 106—181 |
| 2,755,223 | 7/1956 | Illman | 208—45 |
| 2,909,441 | 10/1959 | Pickell | 106—123 |
| 2,973,280 | 2/1961 | Hoiberg et al. | 106—281 |
| 3,004,862 | 10/1961 | Winslow | 208—44 |
| 3,062,672 | 11/1962 | Kerkhoven et al. | 106—281 |

ALEXANDER H. BRODMERKEL, *Primary Examiner.*

ALPHONSO D. SULLIVAN, MORRIS LIEBMAN,
*Examiners.*

H. LEVINE, J. B. EVANS, *Assistant Examiners.*